United States Patent [19]

Konishi et al.

[11] Patent Number: 4,541,021

[45] Date of Patent: Sep. 10, 1985

[54] ELECTRONIC STILL CAMERA

[75] Inventors: Masahiro Konishi, Minami-ashigara; Makoto Murakoshi, Tokyo, both of Japan

[73] Assignee: Fuji Photo Film Co., Ltd., Kanagawa, Japan

[21] Appl. No.: 407,873

[22] Filed: Aug. 13, 1982

[30] Foreign Application Priority Data

Aug. 14, 1981 [JP] Japan .................. 56-127405

[51] Int. Cl.³ .................. G11B 27/00; H04N 5/782
[52] U.S. Cl. .................. 360/35.1; 360/72.1; 360/72.2; 358/335; 358/906
[58] Field of Search .................. 358/906, 335; 360/69, 360/71, 72.1, 72.2, 35.1

[56] References Cited

U.S. PATENT DOCUMENTS 3,925,815  12/1975  Lemelson .................. 360/72.2 X
4,163,256  7/1979  Adcock .................. 358/906 X Primary Examiner—Robert L. Richardson
Attorney, Agent, or Firm—Staas & Halsey

[57] ABSTRACT

An electronic still camera which is capable of taking a still picture purely electronically. Such a camera employs a magnetic tape recorder of audio grade but is able to obtain magnetic records that are excellent in random accessibility for reproducing. The electronic still camera is provided with a magnetic recording unit for recording image data from a photoelectric conversion unit on a magnetic tape preformatted with tape marks defining a plurality of record units, each record unit corresponding to one frame, and a format signal detector for detecting the tape marks or format signals on the magnetic tape. In recording of the image data on the magnetic tape, the record unit preceeding each photographing unit, a photographing unit including a single frame for still photography and a plurality of frames for motion picture photography, is made a non-record unit and the non-record unit is used as a magnetic tape start and stop area.

12 Claims, 11 Drawing Figures

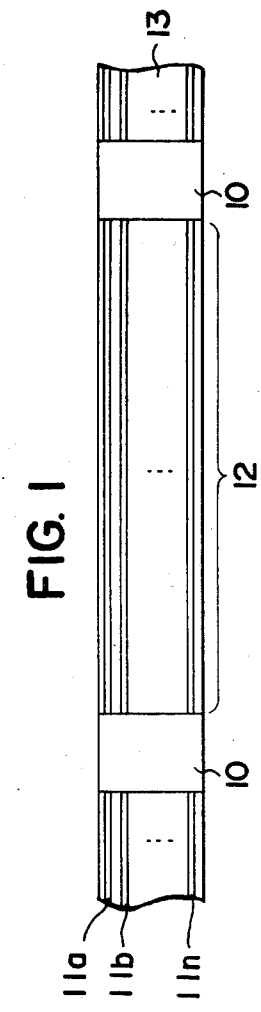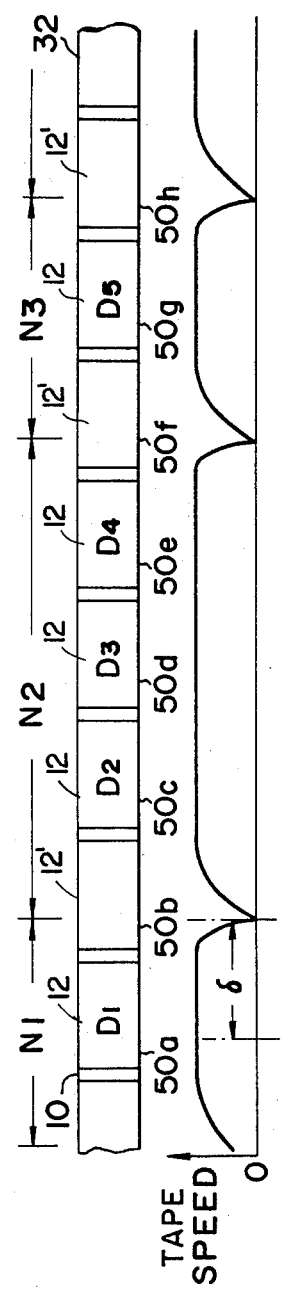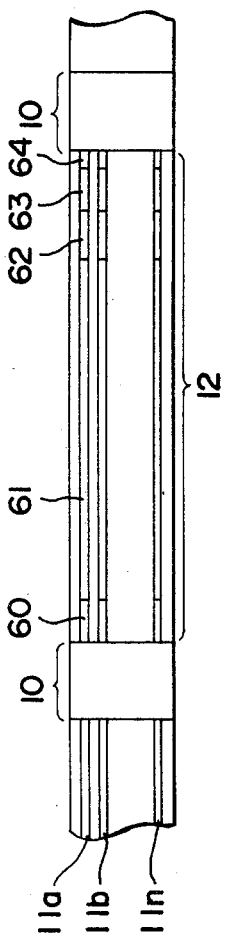

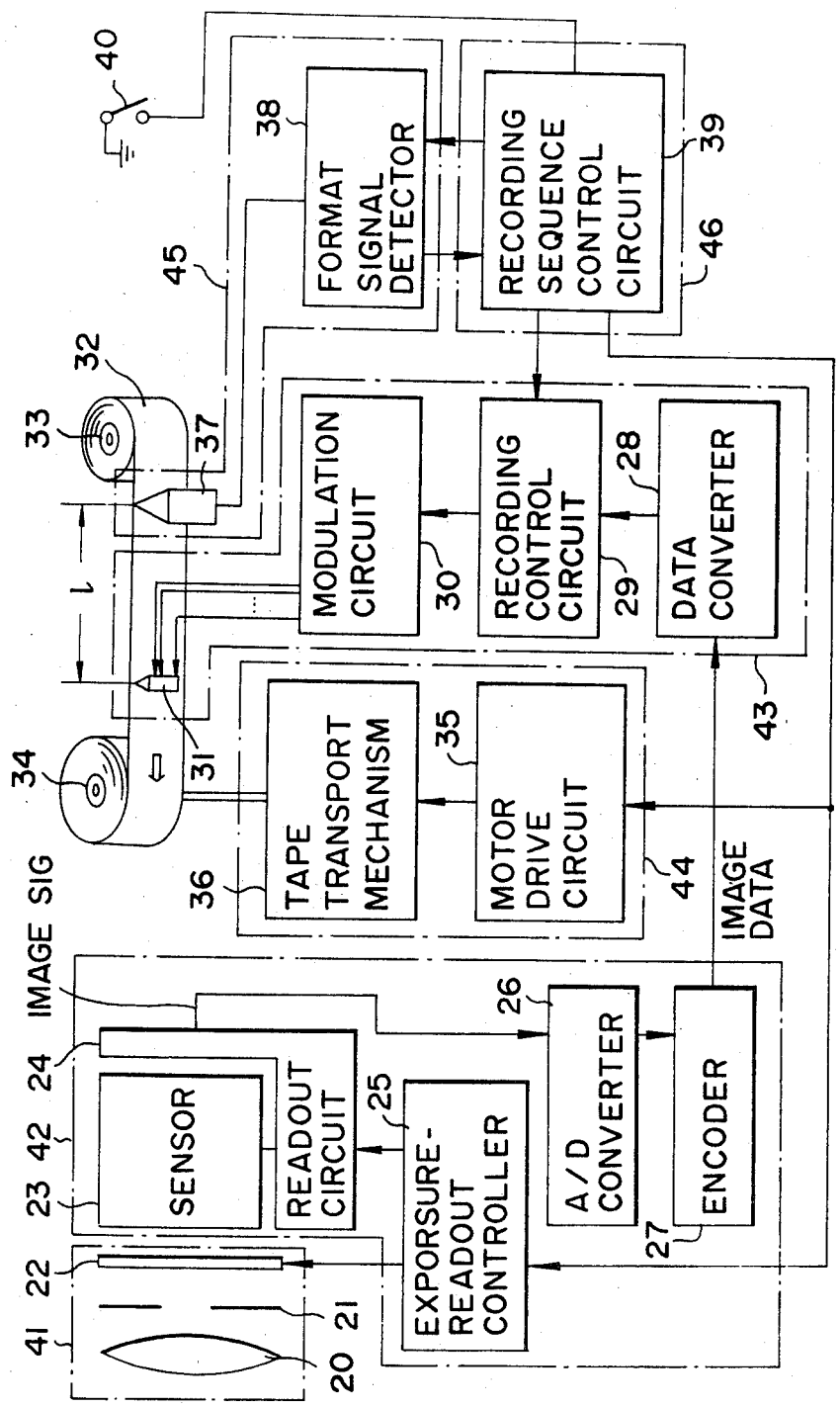

ELECTRONIC STILL CAMERA

BACKGROUND OF THE INVENTION

1. Field of the Invention

The present invention relates to an electronic still camera which permits purely electronic photographing of an object and, more particularly, to improvement in a recording unit of such an electronic still camera.

2. Description of the Prior Art

Recently an electronic still camera has been proposed which employs, in combination, an optoelectro transducer, such as a solid state image sensor or pickup tube, and a recording unit using an inexpensive and large-capacity magnetic tape as a recording medium. Such a camera is adapted to take a still picture of an object purely electronically and to record the picture on the magnetic tape so that the image may be reproduced through the use of a separately provided television system or printer. This type of camera is attracting attention as a future substitute for the existing optical camera which involves chemical treatment of the film for development.

In still photography, since high picture quality is generally required, an optoelectro transducer with a large number of picture elements is needed. Further, the number of quantized bits per picture element must also be large. Since the number of still pictures that can be taken per unit time (the frame speed) is small, unlike in the case of motion picture photography, the read rate of the optoelectro transducer may be low and the quantity of information that must be recorded per unit time can be reduced. A reduction in the quantity of information that must be recorded per unit time can be accomplished by employing a solid state image sensor equipped with the image storage function, for temporarily storing signals from the solid state image sensor in a buffer memory and then reading out the signals at a low speed. Therefore, the recording device for the electronic still camera of the abovesaid type may be, for instance, a magnetic recording device of audio grade, permitting miniaturization of the camera and a reduction of its cost and power dissipation. It is considered that such an electronic still camera would be a good match for conventional optical cameras.

It is noted that still photography is intended primarily for independently observing images of individual frames, it is not suitable to reproduce images of still pictures by using a motion picture image reproducing method according to which a plurality of closely related recorded images are reproduced in the same sequence as that for recording. Thus there is great necessity for quickly reproducing an optimum one of a number of frames or a plurality of frames obtained by multi-exposure photographing one after another. A magnetic tape, however, is essentially a sequential file, and is lacking in random accessibility. Therefore, its improvement is desired, but little attention has been paid to this problem in the past, so that conventional electronic still cameras have the disadvantage of poor random accessibility for playback.

The prior art electronic still cameras employ a system of recording image data on a magnetic tape while forming thereon a recording format during magnetic recording and, in this system, creates varying lengths of record areas, for recording each frame of information, record gaps and file gaps, used as a tape starting and stopping area, vary owing to the dispersion in the characteristics of a tape drive unit and so on. This leads to the shortcoming that a reproducing device cannot accurately recognize information or the position of data to be reproduced. Namely, when it is desired to retrieve an immediately preceding frame during reproducing, since the distance to its position is not available on the side of the reproducing device, the retrieval must always be started from the beginning of the tape or a specified file and, consequently, a long access time is needed. This defect is particularly marked in the case of using a magnetic tape recorder of audio grade.

SUMMARY OF THE INVENTION

It is therefore an object of the present invention to provide a miniaturized, inexpensive and low power consumption electronic still camera which employs a magnetic tape recorder of audio grade but is capable of obtaining magnetic records that are readily random-accessible for reproducing.

Another object of the present invention is to provide an electronic still camera which permits highly efficient use of a magnetic tape in the case of multi-exposure photographing.

Yet another object of the present invention is to provide an electronic still camera which permits high-speed multi-exposure photographing.

Briefly stated, the electronic still camera of the present invention is provided with an optical system including a camera lens, a diaphragm and so forth; a photoelectric conversion unit including a sensor for converting an optical image from the optical system into an electric signal; a magnetic recording unit for recording the image data from the photoelectric conversion unit on a magnetic tape preformatted with tape marks, such as a magnetic or optical mark, to have a plurality of record unts of a fixed length, each corresponding to one frame; a magnetic tape drive controller for driving the magnetic tape for recording thereon by the magnetic recording unit and stopping the magnetic tape after recording; a format signal detector for detecting the tape mark of the magnetic tape; and a controller for performing a control operation to record the image information in an area of the record unit of the magnetic tape in accordance with the signal detected by the format signal detector; wherein the tape marks extend across the entire width of the magnetic tape. For each photographing operation one record unit of the magnetic tape is rendered into a non-record area, which is used as a magnetic tape start and stop area.

BRIEF DESCRIPTION OF THE DRAWINGS

FIG. 1 is a plan view showing an example of a preformatted magnetic tape for use in the electronic still camera of the present invention;

FIG. 2 is a block diagram illustrating the principal parts of an embodiment of the electronic still camera of the present invention;

FIG. 3 is a schematic diagram showing the relationship between the contents of a magnetic tape and the tape travelling speed during actual photographing;

FIG. 4 is a plan view showing the format of a record area in which image data is recorded;

DESCRIPTION OF THE PREFERRED EMBODIMENTS

Figure 5:
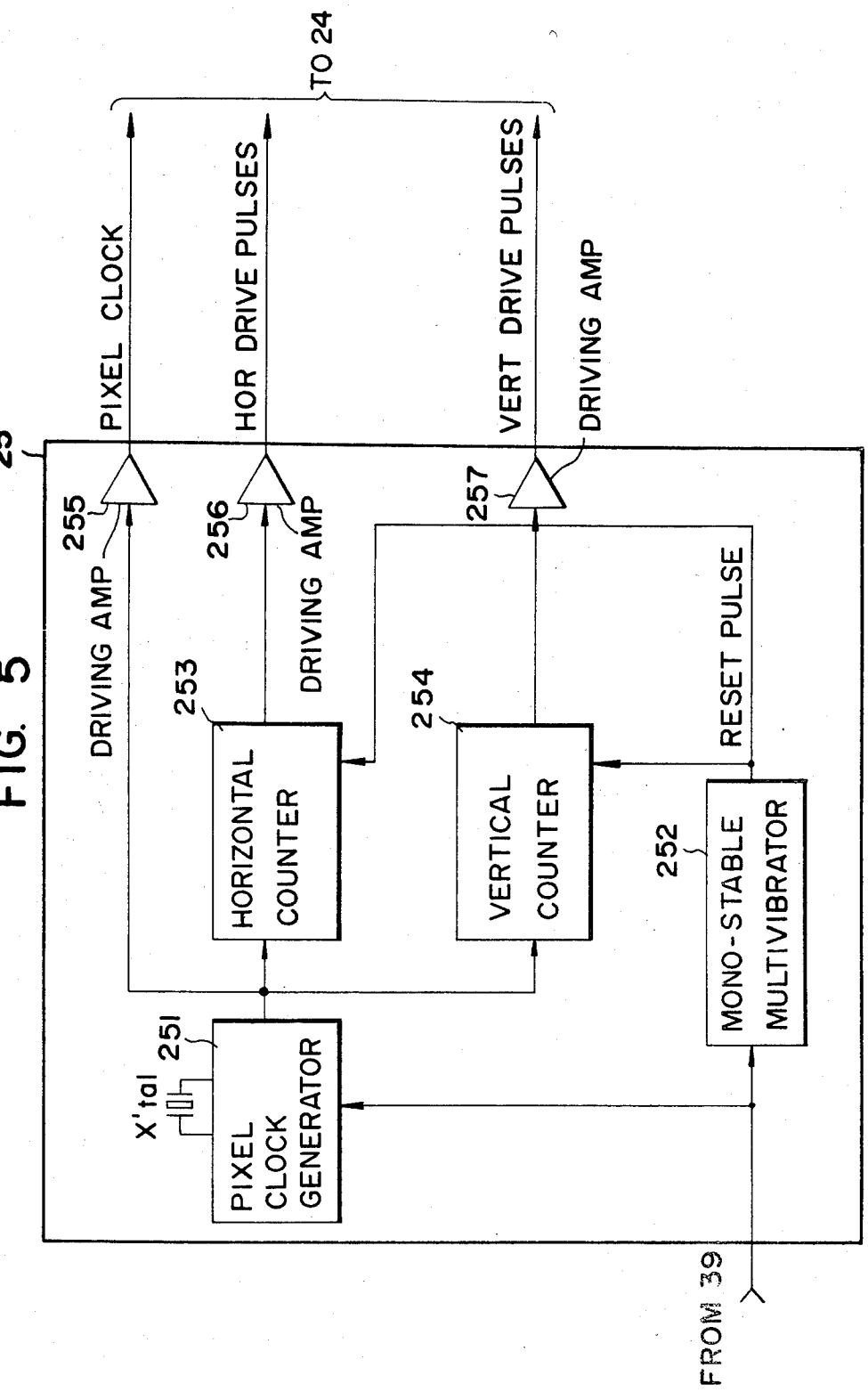
FIG. 5 is a block diagram illustrating an example of an exposure readout controller used in the embodiment of FIG. 2.

In FIG. 1 showing, by way of example, a preformatted magnetic tape for use in the electronic still camera of the present invention, reference numerals 10 indicate format signals serving as tape marks; 11a to 11n designate tracks; 12 identifies a record area which is a record unit; and 13 denotes a magnetic tape. The format signals 10 are recorded on the magnetic tape 13 at regular intervals in its lengthwise direction to define therebetween the record area 12 which is used as an area for recording image data or a magnetic tape start and stop area which will be described later. The length of the record area 12 is determined in consideration of the length of data to be recorded or the length of the start and stop area necessary for a recording and reproducing tape drive mechanism. While in this embodiment the record area 12 is divided into the plurality of tracks 11a to 11n for simultaneous multi-track recording, the record area 12 may also be formed for single track recording.

The format signal 10 may be of any types so long as they are distinguishable from image data. It is advantageous if the format signals 10 are of a frequency which is lower than the frequency of image data (data recording density) which is recorded by a magnetic head in the record area 12, for example, by a signal of a frequency less than 1/10 of the image data recording frequency, because this permits simplification of the construction of the format signal detector. Furthermore, the tape mark need not always be limited specifically to the magnetic mark but may also be an optical mark, such as a perforation in the tape. The format signal is recorded during fabrication of the tape or prior to photographing afterward. In FIG. 1, the format signal 10 is recorded to extend across the entire width of the magnetic tape 13 with a view to enhancing the SN ratio and other factors during reproducing, but this is not always necessary. In general, however, it is desirable for improving the SN ratio to record the format signal in a track wider than a single track width.

FIG. 2 illustrates in block form the principal parts of an embodiment of the electronic still camera of the present invention. Reference numeral 20 indicates a camera lens; 21 a diaphragm; 22 identifies a shutter; 23 denotes a sensor; 24 represents a readout circuit; 25 shows an exposure readout controller; 26 refers to an A/D converter; 27 signifies an encoder; 28 indicates a data converter; 29 designates a recording control cirucit; 30 identifies a channel encoder or modulation circuit; 31 denotes a magnetic head for multi-track recording; 32 represents a magnetic tape; 33 shows a supply reel; 34 refers to a take-up reel; 35 signifies a motor drive circuit; 36 indicates a tape transport mechanism; 37 designates a magnetic head for detecting the format signal; 38 identifies a format signal detector; 39 denotes recording sequence control circuit; 40 represents a shutter button; 41 shows an optical system; 42 refers to a photoelectric conversion unit; 43 signifies a magnetic recording unit; 44 indicates a magnetic tape drive controller; 45 designates a format signal detecting unit; and 46 identifies a controller.

The electronic still camera of this embodiment comprises, as illustrated in FIG. 2, the optical system composed of the camera lens 20, the diaphragm 21 and the shutter 22; the photoelectric conversion unit 42 including the sensor 23 for converting an optical image from the optical system 41 into an electric signal; the magnetic recording unit 43 having the magnetic head 31 for simultaneous multi-track recording of the image data from the photoelectric conversion unit 42 on the formatted magnetic tape 32 described previously with respect to FIG. 1; the magnetic tape drive controller 44 for driving the magnetic tape 32 for recording thereon by the magnetic head 31 and stopping the tape 32 after recording; the format signal detecting unit 45 for detecting the format signal on the magnetic tape 32; and the controller 46 for performing a control operation to record the image data in a predetermined area of the magnetic tape on the basis of the signal detected by the format signal detecting unit 45.

In FIG. 2, prior to photographing, the shutter 22 is closed and the magnetic tape 32 stands still and, further, the format signal detecting unit 45 is also out of operation. Upon pressing the shutter button 40, the recording sequence control circuit 39 starts the exposure readout controller 25, the motor drive circuit 35 and the format signal detector 38. Then, the exposure readout control circuit 25 opens the shutter 22 for a period of time corresponding to the quantity of light necessary to project an optical image of an object onto the image pickup surface of the sensor 23, such as a CCD, BBD or the like, for photoelectric conversion. Further, the motor drive circuit 35 drives the tape transport mechanism 36, by which the magnetic tape 32 is started to travel while being paid out from the reel 33 and taken up on the reel 34.

The image information stored in the sensor 23 is read out serially as image signals in a sequential order by the readout circuit 24, converted by the A/D converter 26 to digital form and encoded by the encoder 27 into image data. Thereafter the image data is converted by the data converter 28 into a form suitable for simultaneous multi-track recording and, at the same time, and error detecting code is generated and added to the image data.

Furthermore, the format signal detector 38, in conjunction with the magnetic head 37 begins to reproduce the tape marks or format signals which are preformatted on the magnetic tape 32. Upon detecting a format signal 10 recorded on the magnetic tape 32, the format signal detector 38 provides information to the recording sequence control circuit 39, which in turn activates the recording control circuit 29 after an elapsed time corresponding to the distance l between the positions of the format signal detecting magnetic head 37 and the multi-track data recording magnetic head 31. As a result of this, the image data from the data converter 28 is encoded by the channel encoder circuit 30 into a form suitable for recording, and thereafter is recorded in a record area 12 of the magnetic tape 32.

In the case where the shutter button 40 is continually depressed, the recording sequence control circuit 39 operates in a multi-exposure mode in which the aforementioned operations, such as opening and closing of the shutter 22, readout of data from the sensor 23, conversion and recording of the image data and so forth, are repeatedly performed. Accordingly, the magnetic tape 32 keeps running at a constant speed and image data corresponding to one frame is recorded in each record area 12 of the tape 32. Upon detection of release of depression of the shutter button 22, the recording sequence control circuit 39 applies a stop signal to the motor drive circuit 35 to stop the magnetic tape 32 from running. It is also possible to stop the travelling of the magnetic tape 32 when the data converter 28 indicates that the data has all been recorded. In the case of single-exposure photographing, the shutter button 40 is immediately released and data of only one frame is provided to the data converter 28, so that the magnetic tape 32 is stopped immediately after the image data is recorded in one record area of the magnetic tape 32. Switching between the multi-exposure and the single-exposure mode may be effected by means of a separately provided switch.

FIG. 3 is a schematic diagram showing the relationship of the recorded contents of the magnetic tape 32 and the speed at which the working gap of the magnetic head 31 run across respective parts of the magnetic tape 32 (tape speed) in the case where one-frame single-exposure photographing N1, three-frame multi-exposure photographing N2 and one-frame single-exposure photographing N3 procedures are sequentially carred out through using the electronic still camera shown in FIG. 2. As illustrated in FIG. 3, in any of the photographing procedures N1 to N3 the magnetic tape 32 travels at a constant speed from immediately before the working gap of the magnetic head 31 run across the record area 12 until after the entire record area 12 and, in this constant speed travelling state, the image data is written. That is, in the one-frame single-exposure photographing N1, frame information $D_1$ is recorded in a record area 50a; in the three-frame multi-exposure photographing N2, frame information $D_2$ to $D_4$ is recorded in record areas 50c to 50e; and, in the next one-frame single-exposure photographing N3, frame information $D_5$ is recorded in a record area 50g. Further, in any of the photographing procedures N1 to N3, the magnetic tape 32 is stopped in a record area of one frame immediately after the end of image data as indicated by 50b, 50f and 50h in FIG. 3. In this way, according to the present invention, a record area 12 of one frame is made a non-record area 12' for each photographing unit and the non-record area 12' is used for starting and stopping the magnetic tape. Therefore, the tape speed is constant during recording because the tape drive mechanism starts, i.e., speeds up, and stops, i.e., slows down, in the time when non-record areas 12' pass the recording head 21.

FIG. 4 is a plan view showing the recording format of the record area in which the image data are recorded. The record area 12 between the format signals 10 corresponds to one frame, and a pre-synchronizing signal 60, an image data 61, an error detecting code 62 and a post-synchronizing signal 63 are recorded on the plurality of tracks 11a to 11n of the record area 12, respectively. Reference numeral 64 indicates a jitter absorption area which is provided as required.

Figure 6:
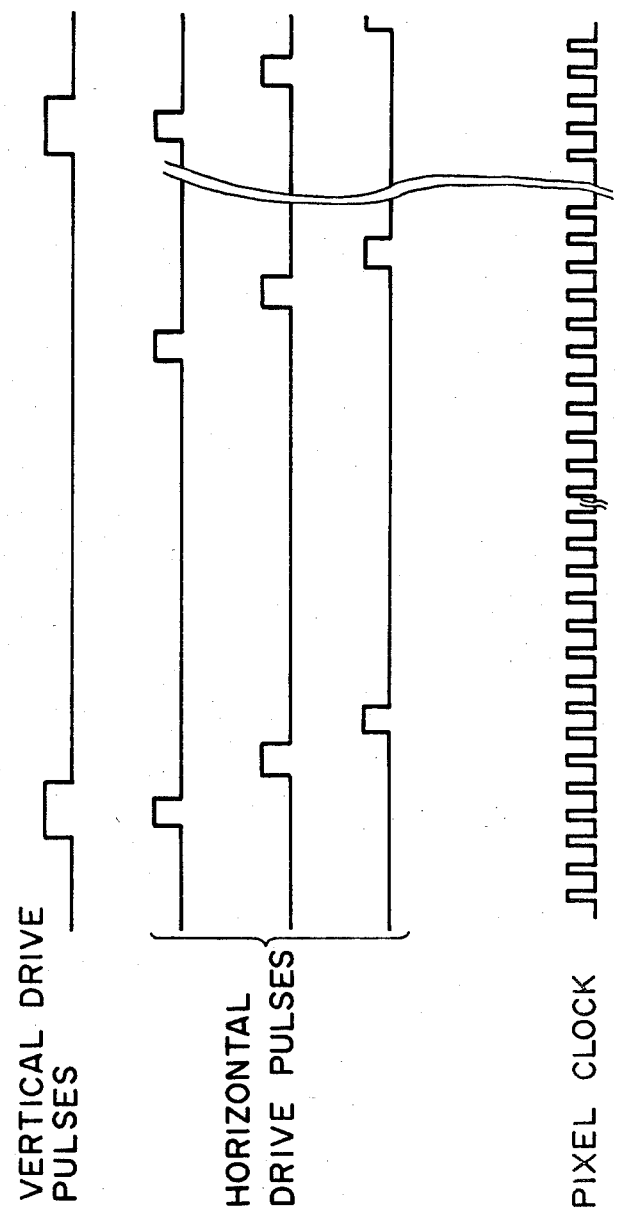
FIG. 6 is a timing chart illustrating the operation of the exposure readout controller depicted in FIG. 5.

FIG. 5 is a block diagram illustrating an example of the exposure readout controller 25 used in the embodiment of FIG. 2. FIG. 6 is a timing chart showing pixel clock pulses, horizontal drive pulses and vertical drive pulses in the case where the sensor 23 in FIG. 2 is formed by 384 pixels in the horizontal direction and 262 pixels in the vertical direction. In FIG. 5 reference numeral 251 indicates a pixel clock generator which is controlled by the output from the recording sequence control circuit 39; 252 designates a mono-stable multivibrator which is also controlled by the output from the recording sequence control circuit 39; 253 identifies a horizontal counter for generating the horizontal drive pulses; 254 denotes a vertical counter for generating the vertical drive pulses; and 255 to 257 represent driving amplifiers. The horizontal counter 253 and the vertical counter 254 are reset by reset pulses from the mono-stable multivibrator 252.

Figure 7:
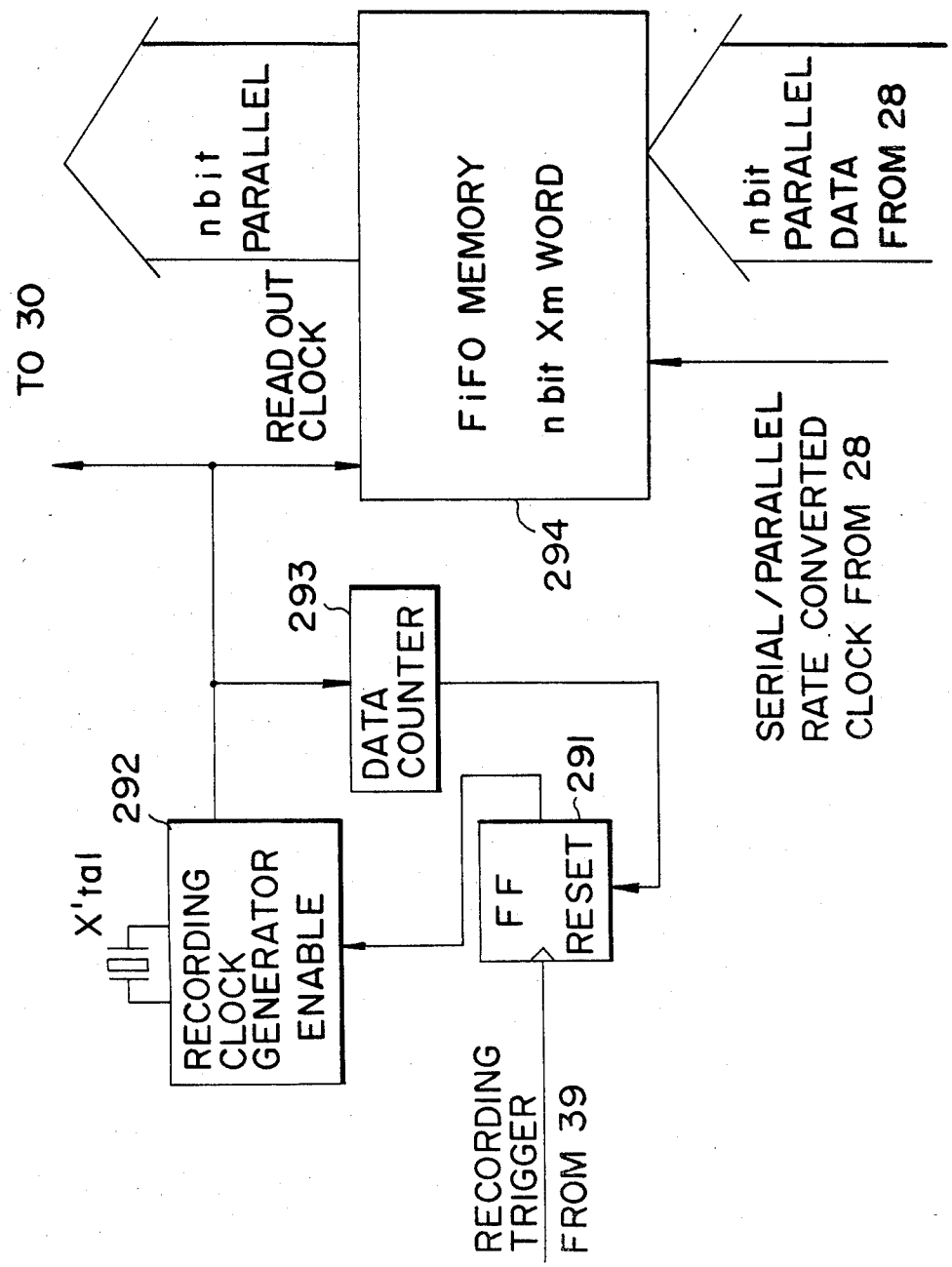
FIG. 7 is a block diagram illustrating an example of a recording control circuit employed in the embodiment of FIG. 2.

FIG. 7 is a block diagram illustrating an example of the recording control circuit 29 used in the embodiment of FIG. 2. In FIG. 7 reference numeral 291 indicates a flipflop; 292 designates a recording clock generator; 293 identifies a data counter; and 294 denotes a FIFO memory, which has a capacity of n bits × m words when the number of recording tracks is n.

Figure 8:
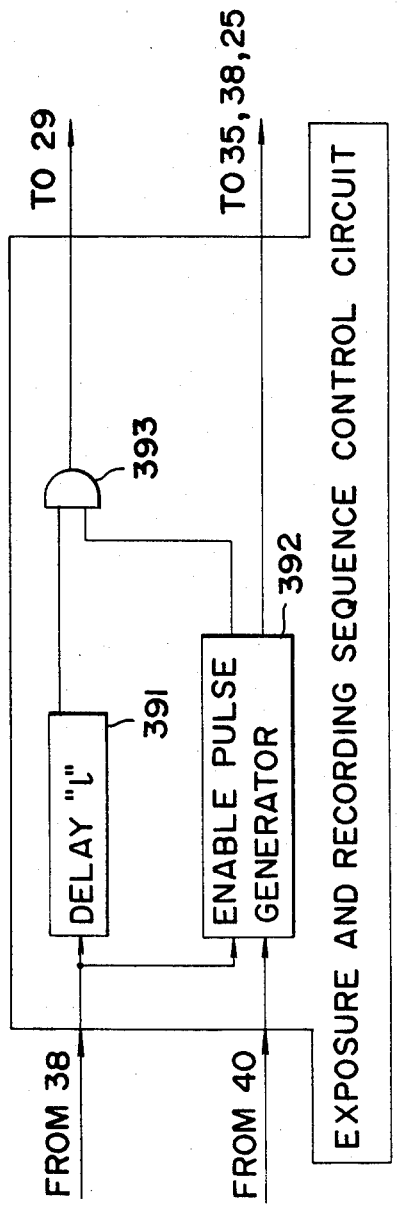
FIG. 8 is a block diagram illustrating an example of a recording sequence control circuit utilized in the embodiment of FIG. 2.
Figure 9:
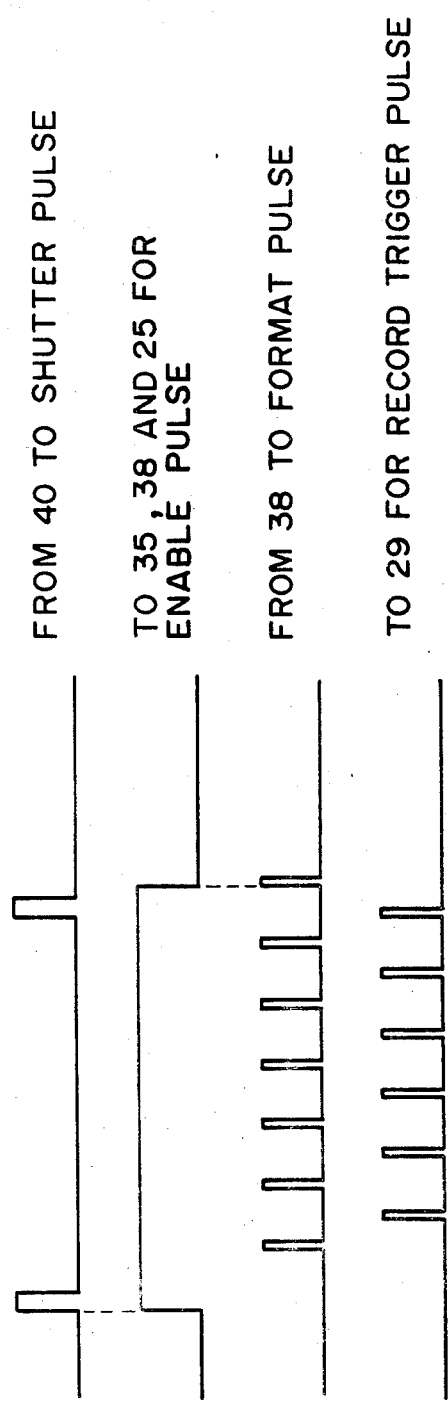
FIGS. 9 and 10 are timing charts illustrating the operation of the recording sequence control circuit shown in FIG. 8.
Figure 10:
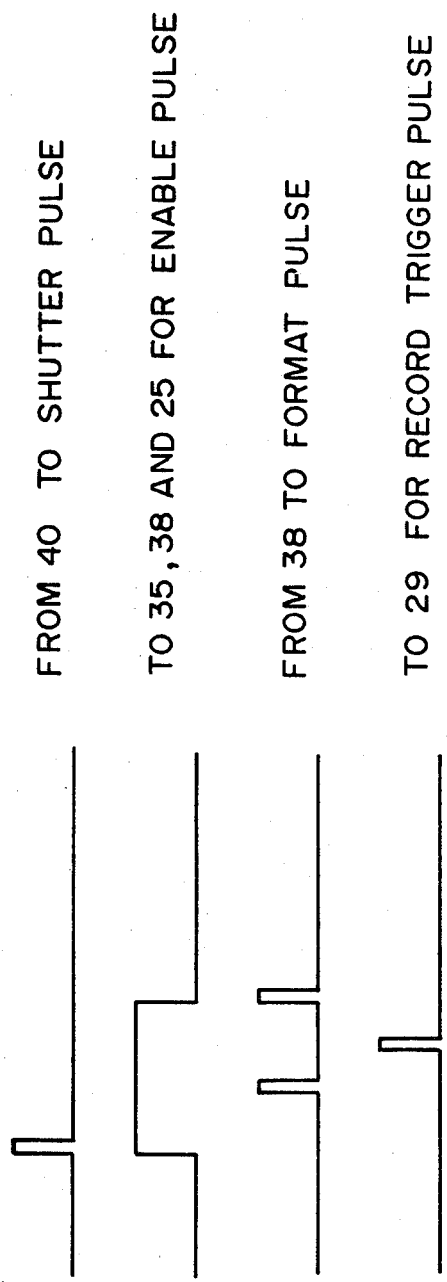

FIG. 8 is a block diagram illustrating an example of the recording sequence control circuit employed in the embodiment of FIG. 2. In FIG. 8 reference numeral 391 indicates a delay circuit for delaying the output signal from the format signal detector 38 for a period of time corresponding to the distance l between the magnetic heads 31 and 37; 392 designates an enable pulse generator; and 393 identifies an AND circuit. FIGS. 9 and 10 are timing charts showing the operation of the recording sequence control circuit 39 during multi-exposure and single-exposure photographing, respectively.

Figure 11:
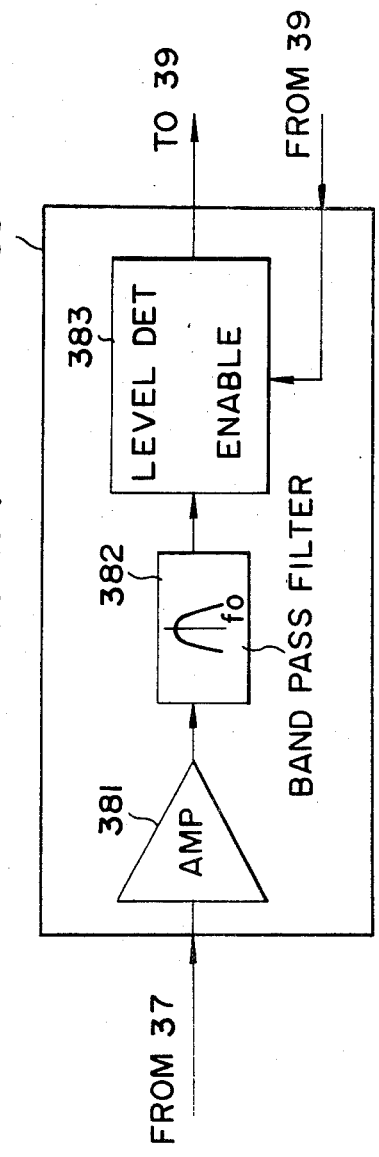
FIG. 11 is a block diagram illustrating an example of a format signal detector employed in the embodiment of FIG. 2.

FIG. 11 is a block diagram illustrating an example of the format signal detector 38 used in the embodiment of FIG. 2. In FIG. 11 reference numeral 381 indicates an amplifier; 382 designates a band-pass filter which has a center frequency $f_0$ equal to the format signal or recorded formatting pattern frequency; and 383 identifies a level detector.

As will be appreciated from the foregoing description, according to the present invention, a magnetic tape is used which is preformatted to have a plurality of record units of a fixed length, each corresponding to one frame, and image data is recorded in the record units (record areas), so that frame information is recorded at a predetermined position on the magnetic tape unlike in the prior art system which forms a recording format during recording. This allows the reproducing device to accurately recognize the position of data to be reproduced, providing for enhanced random accessibility for playback. Furthermore, it is also possible, of course, that closely related images obtained by multi-exposure photographing are reproduced in succession in a movie mode. Moreover, since the record area of one frame is rendered into a non-record area for each photographing unit and used as an area for starting and stopping the magnetic tape, the magnetic tape can be used highly efficiently in the case of multi-exposure photographing that requires a large frame capacity. In addition, since all the record units are not used for recording image data, a mechanism for driving the magnetic tape in a backward direction and a control circuit therefor are not needed and, consequently, the recording device of the electronic still camera of the present invention can be made small and inexpensive, as compared with a conventional recording device, in which, after each photographing operation, the magnetic tape is deiven in the backward direction, for example, by a distance δ in FIG. 3 in anticipation of the tape starting distance in preparation for the next photographing. Further, since the long area of one record unit can be used as the tape start and stop area, the speed rise-up characteristic in the magnetic tape drive device can also be alleviated. Thus, the electronic still camera of the present invention is excellent in random accessibility for playback while at the same time fulfilling the requirements of miniaturization and low cost of the camera itself. Furthermore, it is also possible to reproduce images of motion pictures mixed in images of still pictures.

It will be apparent that many modifications and variations may be effected without departing from the scope of the novel concepts of the present invention.

What is claimed is:

1. An electronic still camera, comprising:
   an optical system;
   a photoelectric conversion unit including a sensor for converting an optical image from the optical system into electrical signals corresponding to image data;
   a magnetic recording unit, operatively connected to the photoelectric conversion unit, for recording the image data from the photoelectric conversion unit on a magnetic tape, the magnetic tape being preformatted with tape marks to have a plurality of record units of a fixed length, each record unit corresponding to one frame, the magnetic recording unit recording still pictures on photographing units including a single frame, the record area preceeding each photographing unit being a non-record area used as a start and stop area for starting and stopping the magnetic tape;
   a format signal detector for detecting the tape marks on the magnetic tape;
   a controller, operatively connected to the format signal detector, for controlling the magnetic recording unit so as to record the image data in the area of each record unit of the magnetic tape in accordance with the signal detected by the format signal detector; and
   a magnetic tape drive unit, operatively connected to the format signal detector and the controller, for driving the magnetic tape for recording and stopping the magnetic tape after recording.

2. An electronic still camera according to claim 1, wherein the magnetic tape has a plurality of recording tracks and the magnetic recording unit is arranged for simultaneous multi-track recording of the image data on the plurality of recording tracks in each record unit of the magnetic tape.

3. An electronic still camera according to claim 2, wherein the image data and the tape marks have a recording frequency and the tape marks are of a frequency lower than the image data recording frequency.

4. An electronic still camera according to claim 3, wherein each recording track has a width and each tape mark is wider than the width of the recording track to which it corresponds.

5. An electronic still camera according to claim 2, wherein the tape marks are optical tape marks.

6. An electronic still camera according to claim 2, wherein the magnetic record unit includes a simple recording device of audio grade and wherein the format signal detector is a simple magnetic reproducing device of audio grade.

7. An electronic still and motion picture camera, comprising:
   an optical system;
   a photoelectric conversion unit including a sensor for converting an optical image from the optical system into electrical signals corresponding to image data;
   a magnetic recording unit, operatively connected to the photoelectric conversion unit, for recording the image data from the photoelectric conversion unit on a magnetic tape, the magnetic tape being preformatted with tape marks to have a plurality of record units of a fixed length, each record unit corresponding to one frame, the magnetic recording unit recording still pictures on photographing units including a single frame and motion pictures on photographing units including plurality of frames, the record area preceeding each photographing unit being a non-record area used as a start and stop area for starting and stopping the magnetic tape;
   a format signal detector for detecting the tape marks on the magnetic tape;
   a controller, operatively connected to the format signal detector, for controlling the magnetic recording unit so as to record the image data in the area of each record unit of the magnetic tape in accordance with the signal detected by the format signal detector; and
   a magnetic tape drive unit, operatively connected to the format signal detector and the controller, for driving the magnetic tape for recording and stopping the magnetic tape after recording.

8. An electronic still and motion picture camera according to claim 7, wherein the magnetic tape has a plurality of recording tracks and the magnetic recording unit is arranged for simultaneous multi-track recording of the image data on the plurality of recording tracks in each record unit of the magnetic tape.

9. An electronic still and motion picture camera according to claim 8, wherein the image data and the tape marks have a recording frequency and the tape marks are of a frequency lower than the image data recording frequency.

10. An electronic still and motion picture camera according to claim 9, wherein each recording track has a width and each tape mark is wider than the width of the recording track to which it corresponds.

11. An electronic still and motion picture camera according to claim 8, wherein the tape marks are optical tape marks.

12. An electronic still and motion picture camera according to claim 8, wherein the magnetic record unit includes a simple recording device of audio grade and wherein the format signal detector is a simple magnetic reproducing device of audio grade.

* * * * *